(12) United States Patent
Yang

(10) Patent No.: US 10,791,331 B2
(45) Date of Patent: Sep. 29, 2020

(54) FOLDABLE ELECTRONIC DEVICE AND FILE DECOMPRESSION METHOD

(71) Applicant: HON HAI PRECISION INDUSTRY CO., LTD., New Taipei (TW)

(72) Inventor: Yeh-Wei Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 257 days.

(21) Appl. No.: 15/995,280

(22) Filed: Jun. 1, 2018

(65) Prior Publication Data

US 2019/0364287 A1    Nov. 28, 2019

(30) Foreign Application Priority Data

May 22, 2018 (CN) .......................... 2018 1 0494263

(51) Int. Cl.
*H04N 19/172* (2014.01)
*G06K 7/14* (2006.01)
*H04N 5/374* (2011.01)
*H04M 1/02* (2006.01)

(52) U.S. Cl.
CPC ......... *H04N 19/172* (2014.11); *G06K 7/1439* (2013.01); *H04M 1/0268* (2013.01); *H04N 5/374* (2013.01)

(58) Field of Classification Search
CPC combination set(s) only.
See application file for complete search history.

(56) References Cited

U.S. PATENT DOCUMENTS

2014/0115720 A1* 4/2014 Yi .......................... G06F 21/105
                                                   726/27
2016/0116944 A1* 4/2016 Lee ....................... H04M 1/022
                                                   361/679.26

FOREIGN PATENT DOCUMENTS

| CN | 1790108 A | 6/2006 |
| CN | 105549682 A | 5/2016 |
| TW | 201225619 A | 6/2012 |

* cited by examiner

*Primary Examiner* — Van N Chow
(74) *Attorney, Agent, or Firm* — ScienBiziP, P.C.

(57) ABSTRACT

A file decompression method to increase speed of display applied in a foldable electronic device includes receiving an image file, compressed into a much smaller form, from a peripheral device, and displaying the received file at least on the second display area, and transmitting a first control signal to an image sensor. The first control signal controls the image sensor to scan the image file on the second display area to identify image and compression data therein and information as to such data is obtained from the image sensor. If the data permits decompression and decompression is performed, the image is displayed as a match of the original uncompressed file.

15 Claims, 4 Drawing Sheets

FOLDABLE ELECTRONIC DEVICE AND FILE DECOMPRESSION METHOD

FIELD

The subject matter herein generally relates to an electronic device and a file decompression method applied thereto.

BACKGROUND

Data compression is encoding information using fewer bits than in the original representation. The reversal of the process (decompression) involves decoding information for retrieving the original presentation. Although data compression and decompression are well known, a new data decompression method is still needed.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
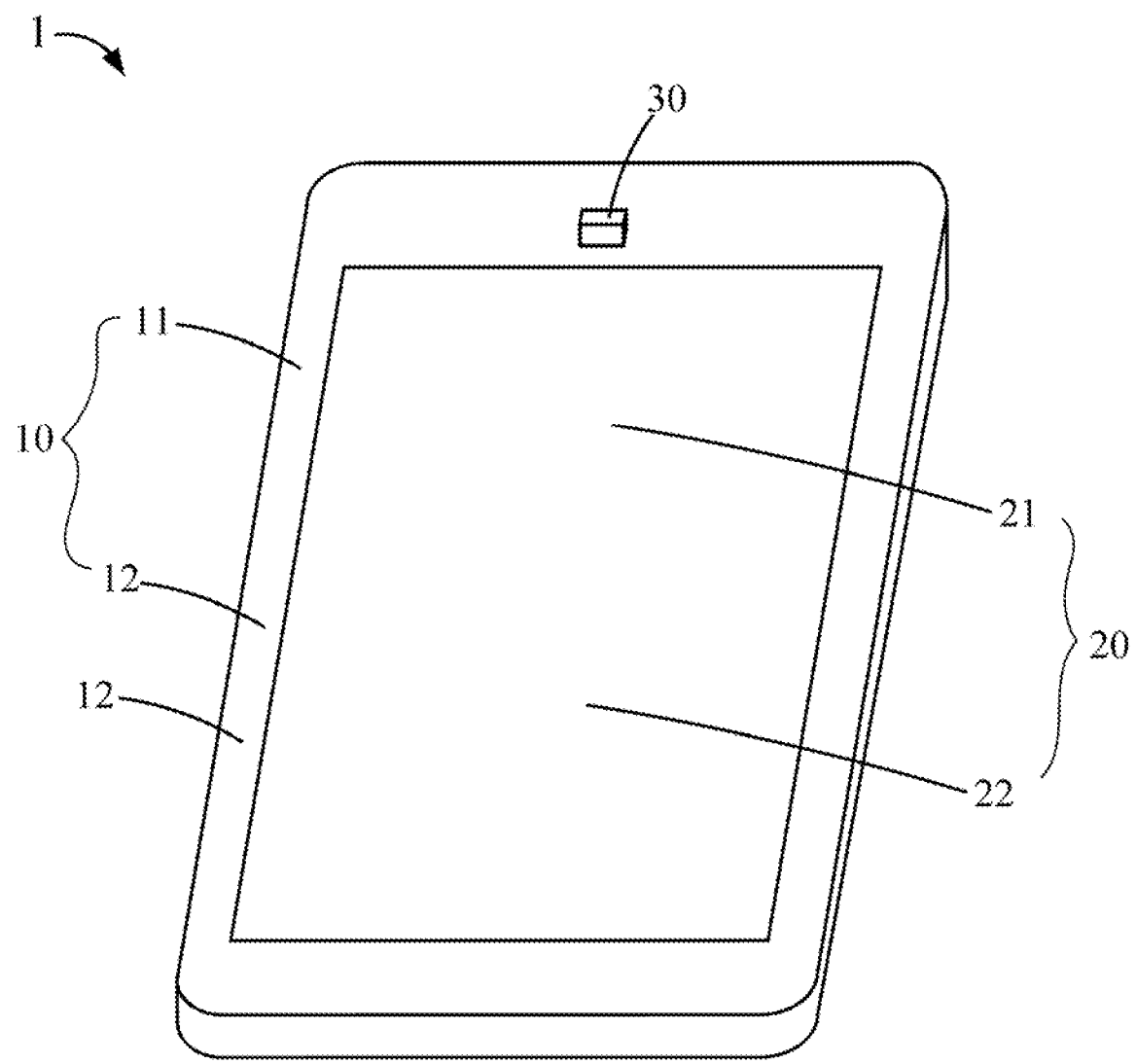
FIG. 1 illustrates a diagrammatic view of an embodiment of a foldable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates an embodiment of a foldable electronic device 1. The foldable electronic device 1 can be any foldable or flexible device, such as a smart phone, a tablet computer, or a personal digital assistant.

The foldable electronic device 1 comprises a foldable casing 10, a foldable display screen 20, and an image sensor 30. The foldable casing 10 comprises a first casing portion 11 and a second casing portion 12 connected to the first casing portion 11. The foldable display screen 20 is mounted on a surface of the foldable casing 10. The foldable display screen 20 comprises a first display area 21 on the first casing portion 11 and a second display area 22 on the second casing portion 12.

The foldable electronic device 1 can be folded or unfolded. When the foldable electronic device 1 is unfolded, the first casing portion 11 and the second casing portion 12 are coplanar, and the first display area 21 and the second display area 22 are also coplanar. When the foldable electronic device 1 is folded, the first casing portion 11 and the second casing portion 12 are on different planes, and the first display area 21 and the second display area 22 are also on different planes.

The image sensor 30 is mounted on the surface of the foldable casing 10 having the foldable display screen 20 mounted thereon, and is positioned at an edge of the first casing portion 11 facing away from the second casing portion 12. When the foldable electronic device 1 is folded, at least the second display area 22 is within a sensing range (that is, a scanning range) of the image sensor 30. In an embodiment, the image sensor 30 is a CMOS sensor.

The foldable electronic device 1 further comprises a communication interface 40. The communication interface 40 can receive an image file from a peripheral device 2. The image file is formed by compressing an original file. The communication interface 40 can be a wireless communication interface or a wired communication interface. In an embodiment, the communication interface 40 is a wireless communication interface, such as a WI-FI communication interface, an infrared communication interface, or a BLUETOOTH™ communication interface. The image file can be a QR code or a stacked two-dimensional code. The size of the image file is smaller than the size of the original file. For example, the size of the image file is only a few percent or a few thousandths of the size of the original file. Thus, it can reduce resources required to store and transmit data. The peripheral device 2 can be another foldable electronic device 1, that is, the peripheral device 2 and the foldable electronic device 1 have a same model and a same structure.

When in use, a user can select one file stored in the peripheral device 2 as the original file, and further select a compression mode and a fault tolerance for the original file. Then, the peripheral device 2 can compress the original file according to the selected compression mode and the selected fault tolerance, thereby obtaining the image file. The compression mode indicates the format of the original file after compression, that is, the format of the image file. The fault tolerance indicates the property that enables the foldable electronic device 1 to decompress in full in the event of a portion of the image file being covered or shielded.

The foldable electronic device 1 further comprises a storage device 60 and a processor 50. The storage device 60 stores a file decompression system 100. The system 100 comprises a number of modules, which are a collection of software instructions executable by the processor 50 to perform the function of the system 100. The storage device 60 can be an internal storage device built inside the foldable electronic device 1. The storage device 16 can also be an external storage device removably connected to the foldable electronic device 1. For example, the storage device 60 can be a smart media card, a secure digital card, or a flash card. The processor 50 can be a central processing unit, a microprocessor, or any other suitable chip having data processing function.

The system 100 comprises an obtaining module 101, a control module 102, a decompression module 103, and an determination module 105.

Figure 2:
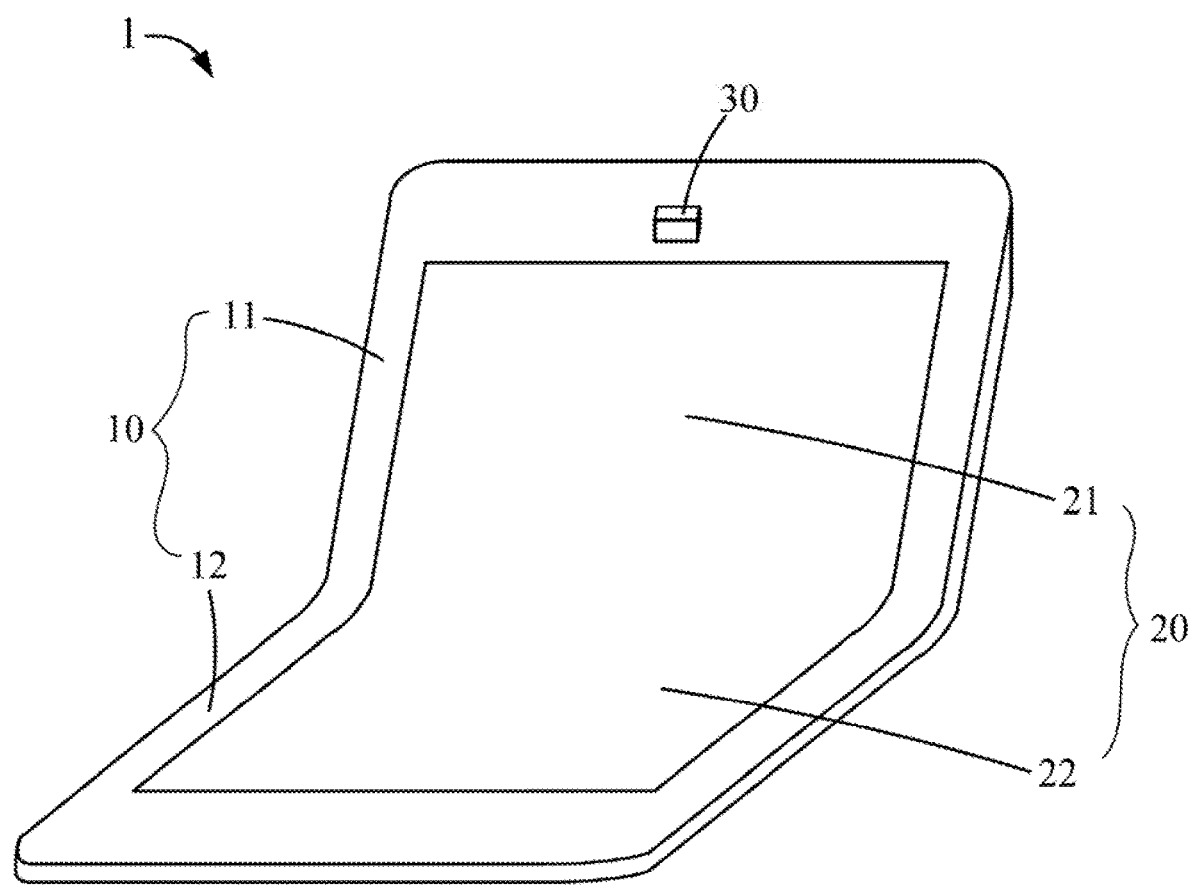
FIG. 2 is similar to FIG. 1, but showing the foldable electronic device in another state.
Figure 3:
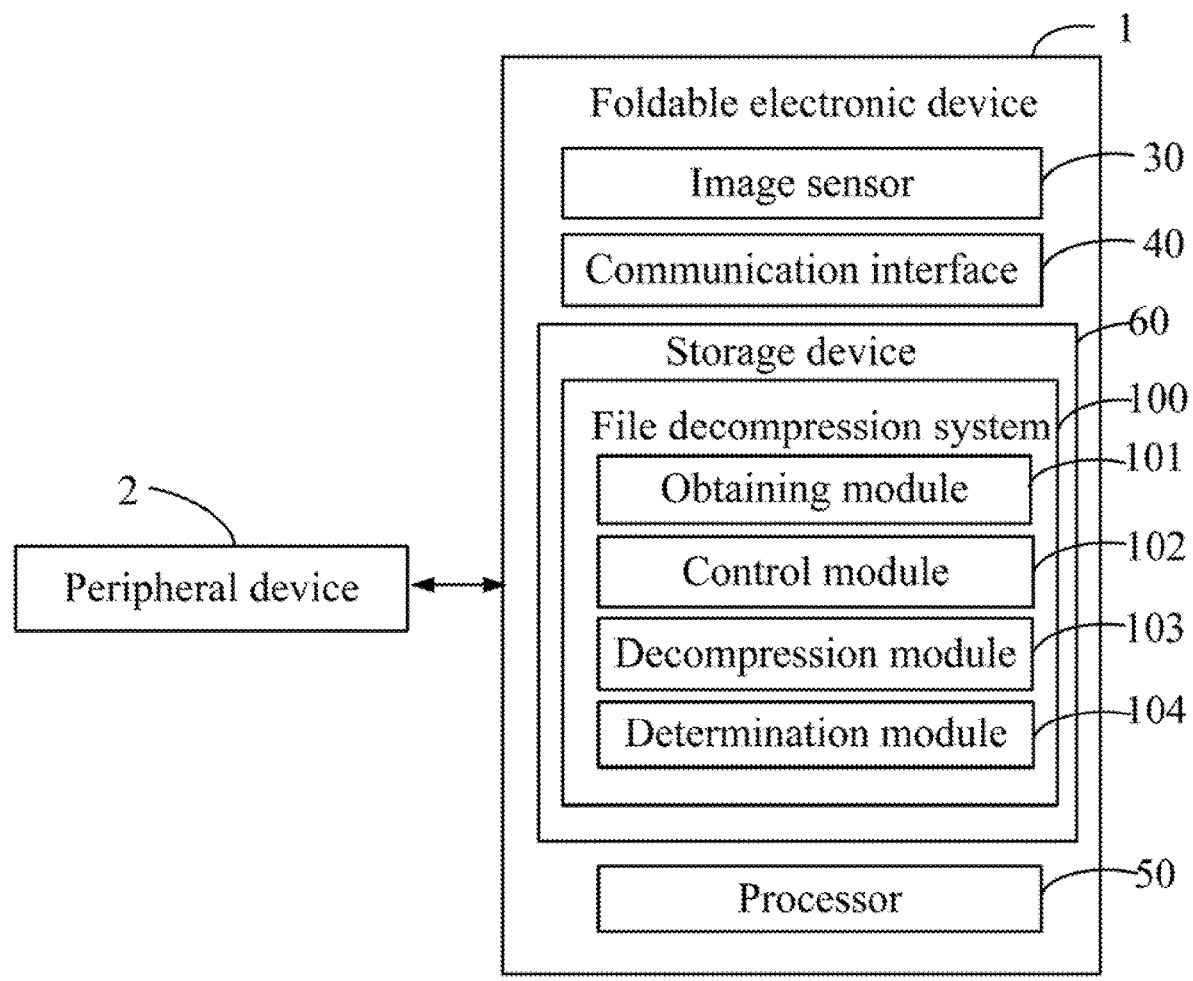
FIG. 3 illustrates a block diagram of the foldable electronic device of FIG. 1.
Figure 4:
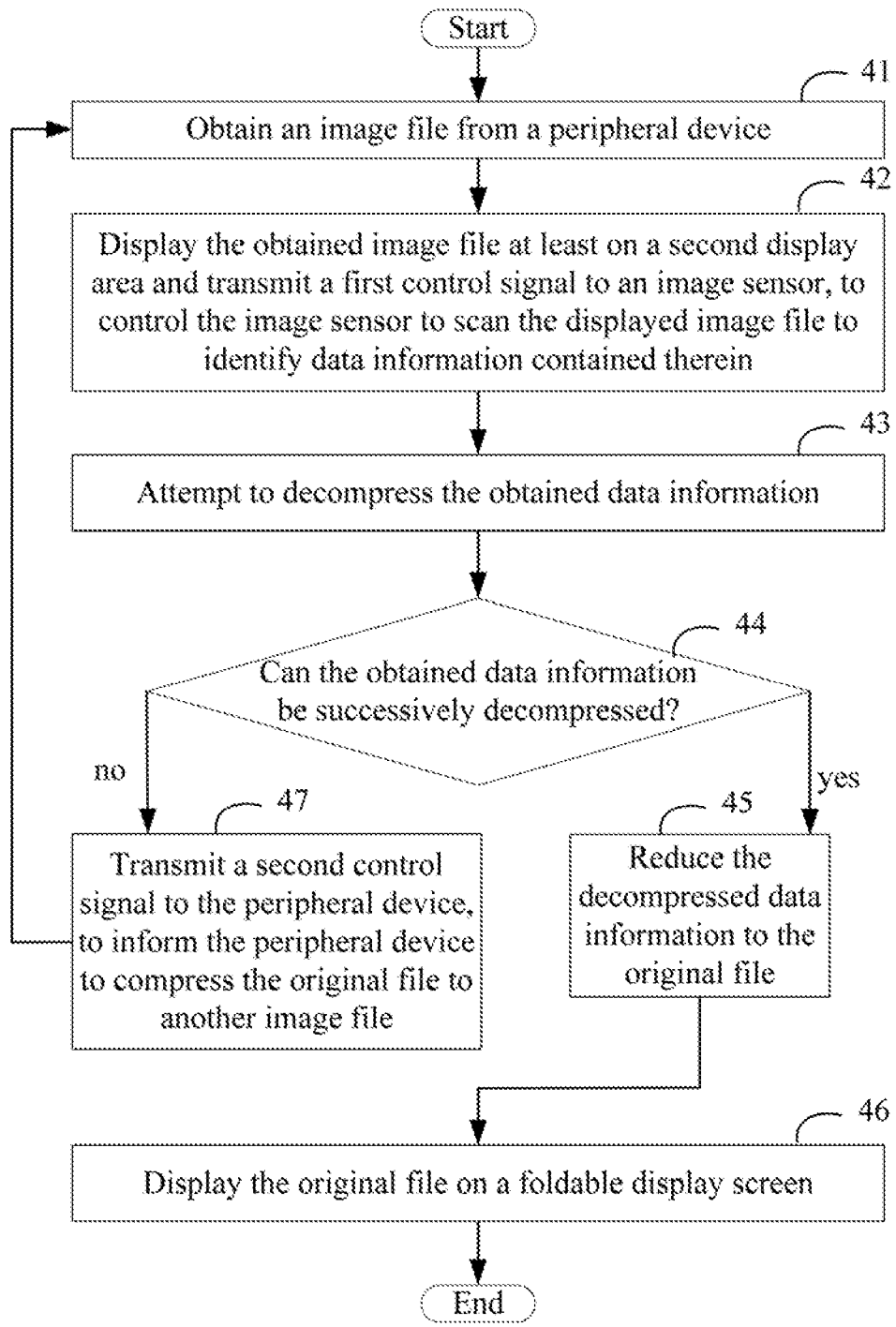
FIG. 4 illustrates a flowchart of an embodiment of a file decompression method.

FIG. 4 illustrates an embodiment of a file decompression method. The method is provided by way of example, as there are a variety of ways to carry out the method. The method described below can be carried out using the configurations illustrated in FIGS. 1-3, for example, and various elements of these figures are referenced in explaining the method. Each block shown in FIG. 4 represents one or more processes, methods, or subroutines, carried out in the example method. Furthermore, the illustrated order of blocks is illustrative only and the order of the blocks can change. Additional blocks can be added or fewer blocks may be utilized or the order of the blocks may be changed, without departing from this disclosure. The method can begin at block 41.

At block 41, the obtaining module 101 obtains the image file from the communication interface 40.

At block 42, the control module 102 displays the obtained image file at least on the second display area 22 of the foldable display screen 20, and transmits a first control signal to the image sensor 30 through the communication interface 40. The first control signal is configured to control the image sensor 30 to scan the displayed image file on the second display area 22 to identify data information contained therein.

In an embodiment, the control module 102 further controls the foldable electronic device 1 to output a reminding signal when the obtaining module 101 obtains the image file. The reminding signal can remind the user to bend the foldable electronic device 1 to cause foldable electronic device 1 to be folded, thereby causing the displayed image file to be within the scanning range of the image sensor 30. Thus, the image sensor 30 can scan the displayed image file. For example, the foldable electronic device 1 can further comprise a speaker (not shown). The control module 102 can control the speaker to output sound that remind the user to bend the foldable electronic device 1. That is, the control signal is in form of sound.

In an embodiment, the control module 102 displays the obtained image file on the second display area 22 only, thereby allowing the image sensor 30 to scan the whole displayed image file.

In an embodiment, the first control signal controls the image sensor 30 to perform pretreatments, and controls the image sensor 30 to identify the data information after the pretreatments. The pretreatments can be grayscale processing, noise reduction, edge detection, contour extraction, and distortion correction. The first control signal can control the image sensor 30 to divide the displayed image file into a plurality of sections and identify the data information section-by-section.

At block 43, the decompression module 103 obtains the data information from the image sensor 30, and attempts to decompress the obtained data information.

At block 44, the determination module 104 determines whether the decompression module 103 is able to decompress the obtained data information. If yes, the procedure goes to block 45, otherwise the procedure goes to block 47.

At block 45, the decompression module 103 reduces the decompressed data information to the original file.

In an embodiment, the decompression module 103 decompresses the obtained data information section-by-section, and combines the decompressed data information to the original file.

At block 46, the control module 102 displays the original file on the foldable display screen 20.

At block 47, the control module 102 transmits a second control signal to the peripheral device 2 through the communication interface 40. The second control signal is configured to cause the peripheral device 2 to compress the original file into another image file and to transmit the another image file to the foldable electronic device 1. Then, block 41 is repeated.

In an embodiment, the second control signal causes the peripheral device 2 to compress the original file according to another compression mode and/or another fault tolerance.

With the above configuration, when the image sensor 30 scans and identifies the image file, the system 100 can decompress the image file to achieve the original file. The decompression process is easy to implement, and can reduce resources during file transmission.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A foldable electronic device comprising:
   a foldable casing comprising a first casing portion and a second casing portion connected to the first casing portion;
   a foldable display screen mounted on a surface of the foldable casing, the foldable display screen comprising a first display area on the first casing portion and a second display area on the second casing portion, when the foldable electronic device is folded, the first casing portion and the second casing portion are on different planes, and the first display area and the second display area are also on different planes;
   an image sensor mounted on the surface of the foldable casing having the foldable display screen mounted thereon, and positioned at an edge of the first casing portion facing away from the second casing portion, when the foldable electronic device is folded, at least the second display area is within a scanning range of the image sensor;
   a communication interface configured to receive an image file from a peripheral device, the image file being formed by compressing an original file;
   a processor; and
   a storage device coupled to the processor and storing one or more programs to be executed by the processor, wherein when executed by the processor, the one or more programs cause the processor to:
  obtain the image file from the communication interface;
  display the obtained image file at least on the second display area, and transmit a first control signal to the image sensor through the communication interface, the first control signal configured to control the image sensor to scan the displayed image file on the second display area to identify data information contained therein; and
  obtain the data information from the image sensor, and attempt to decompress the obtained data information.

2. The foldable electronic device of claim 1, wherein the one or more programs further cause the processor to:
  determine whether the obtained data information can be successively decompressed;
  reduce the decompressed data information to the original file when the obtained data information can be successively decompressed; and
  display the original file on the foldable display screen.

3. The foldable electronic device of claim 2, wherein the one or more programs further cause the processor to:
  transmit a second control signal to the peripheral device through the communication interface when the obtained data information cannot be successively decompressed, the second control signal configured to cause the peripheral device to compress the original file into another image file and to transmit the another image file to the foldable electronic device.

4. The foldable electronic device of claim 3, wherein the second control signal is configured to cause the peripheral device to compress the original file according to another compression mode.

5. The foldable electronic device of claim 3, wherein the second control signal is configured to cause the peripheral device to compress the original file according to another fault tolerance.

6. The foldable electronic device of claim 1, wherein the one or more programs further cause the processor to:
  control the foldable electronic device to output a reminding signal when the image file is obtained from the communication interface, the reminding signal configured to remind a user to bend the foldable electronic device to cause foldable electronic device to be folded, thereby causing the displayed image file to be within the scanning range of the image sensor.

7. The foldable electronic device of claim 1, wherein the obtained image file is displayed only on the second display area, thereby allowing the image sensor to scan the whole displayed image file.

8. The foldable electronic device of claim 1, wherein the image file is a QR code, and the image sensor is a CMOS sensor.

9. A file decompression method applied in a foldable electronic device, the foldable electronic device comprising a foldable casing, a foldable display screen, and an image sensor, the file decompression method comprising:
  receiving an image file from a peripheral device, the image file being formed by compressing an original file;
  displaying the received image file on the foldable display screen, wherein the foldable casing has a first casing portion and a second casing portion connected to the first casing portion, the foldable display screen is mounted on a surface of the foldable casing, the foldable display screen has a first display area on the first casing portion and a second display area on the second casing portion, when the foldable electronic device is folded, the first casing portion and the second casing portion are on different planes, the first display area and the second display area are also on different planes, the received image file is displayed at least on the second display area;
  transmitting a first control signal to the image sensor, the first control signal configured to control the image sensor to scan the displayed image file on the second display area to identify data information contained therein, wherein the image sensor is mounted on the surface of the foldable casing having the foldable display screen mounted thereon, and is positioned at an edge of the first casing portion facing away from the second casing portion, when the foldable electronic device is folded, at least the second display area is within a scanning range of the image sensor; and
  obtaining the data information from the image sensor, and attempting to decompress the obtained data information.

10. The file decompression method of claim 9, further comprising:
  determining whether the obtained data information is able to be decompressed;
  reducing the decompressed data information to the original file when the obtained data information can be successively decompressed; and
  displaying the original file on the foldable display screen.

11. The file decompression method of claim 10, further comprising:
  transmitting a second control signal to the peripheral device when the obtained data information cannot be successively decompressed, the second control signal configured to cause the peripheral device to compress the original file into another image file and to transmit the another image file to the foldable electronic device.

12. The file decompression method of claim 11, wherein the second control signal is configured to cause the peripheral device to compress the original file according to another compression mode.

13. The file decompression method of claim 11, wherein the second control signal is configured to cause the peripheral device to compress the original file according to another fault tolerance.

14. The file decompression method of claim 9, further comprising:
  controlling the foldable electronic device to output a reminding signal when the image file is received from the peripheral device, the reminding signal configured to remind a user to bend the foldable electronic device to cause foldable electronic device to be folded, thereby causing the displayed image file to be within the scanning range of the image sensor.

15. The file decompression method of claim 9, wherein the obtained image file is displayed only on the second display area, thereby allowing the image sensor to scan the whole displayed image file.

* * * * *